United States Patent
Kortney et al.

(10) Patent No.: US 12,032,686 B2
(45) Date of Patent: Jul. 9, 2024

(54) SYSTEM AND METHOD FOR SCALABLE FILE FILTERING USING WILDCARDS

(71) Applicant: Proofpoint, Inc., Sunnyvale, CA (US)

(72) Inventors: Alex Kortney, Pardes-Hana (IL); Nir Barak, Karmei Yosef (IL)

(73) Assignee: Proofpoint, Inc., Sunnyvale, CA (US)

( * ) Notice: Subject to any disclaimer, the term of this patent is extended or adjusted under 35 U.S.C. 154(b) by 396 days.

(21) Appl. No.: 17/419,742

(22) PCT Filed: Jan. 3, 2020

(86) PCT No.: PCT/US2020/012116
§ 371 (c)(1),
(2) Date: Jun. 30, 2021

(87) PCT Pub. No.: WO2020/142649
PCT Pub. Date: Jul. 9, 2020

(65) Prior Publication Data
US 2022/0075870 A1    Mar. 10, 2022

Related U.S. Application Data (60) Provisional application No. 62/788,175, filed on Jan. 4, 2019.

(51) Int. Cl.
  *G06F 21/60* (2013.01)
  *G06F 21/54* (2013.01)
  (Continued)

(52) U.S. Cl.
CPC ............ *G06F 21/552* (2013.01); *G06F 21/54* (2013.01); *G06F 2221/2101* (2013.01)

(58) Field of Classification Search
None
See application file for complete search history.

(56) References Cited

U.S. PATENT DOCUMENTS 5,983,232 A * 11/1999 Zhang ............... G06F 16/90339
                                                       707/999.102
6,463,440 B1 * 10/2002 Hind .................... G06F 40/154
                                                       707/999.102
(Continued)

FOREIGN PATENT DOCUMENTS

WO      2017031326      2/2017

OTHER PUBLICATIONS

CloudEyes: Cloud-based malware detection with reversible sketch for resource-constrained internet of things (IoT) devices. Sun. John Wiley & Sons. (Year: 2016).*

(Continued)

*Primary Examiner* — Venkat Perungavoor
(74) *Attorney, Agent, or Firm* — Sheehan Phinney Bass & Green PA (57) ABSTRACT

A system monitors access to a computer file via a dynamically changeable non-heterogeneous collection load balanced across two hash tables. User activity is monitored on a target device to detect a user entered pattern including a wildcard character. A server in communication with the target device, receives the user entered pattern, selects one of the two hash tables, and calculates an index for the selected hash table based on the user entered pattern. The index is used to access the selected hash table to receive a stored pattern. The hash tables each have a plurality of entries, and each entry includes a list of one or more patterns that have the same hash index but different pattern values sorted by length in characters from longest to shortest.

16 Claims, 10 Drawing Sheets

(51) Int. Cl.
  *G06F 21/55* (2013.01)
  *G06F 21/71* (2013.01)
  *G06F 21/46* (2013.01)
  *G06F 21/78* (2013.01)

(56) References Cited

U.S. PATENT DOCUMENTS

| | | | | |
|---|---|---|---|---|
| 7,711,719 | B1* | 5/2010 | Waldin | G06F 16/334 707/696 |
| 8,688,734 | B1 | 4/2014 | Tidd | |
| 2004/0236720 | A1* | 11/2004 | Basso | H04L 45/74591 |
| 2006/0112112 | A1* | 5/2006 | Margolus | G06F 16/9014 |
| 2006/0173831 | A1 | 8/2006 | Basso et al. | |
| 2014/0195545 | A1* | 7/2014 | Anand | G06F 16/9014 707/747 |
| 2014/0304275 | A1* | 10/2014 | Baskett | G06F 16/9014 707/769 |
| 2015/0213126 | A1* | 7/2015 | Yishay | G06F 16/334 707/722 |

OTHER PUBLICATIONS

GStore: a graph-based SPARQL query engine. Zou. Springer. (Year: 2014).*
Extended European Search Report for EP20735985.2 dated May 2, 2022.
Microsoft Azure "Data Factory Supports Wildcard File Filters for Copy Activity" May 4, 2018, retrieved on Mar. 5, 2020.
Nanwani "Monitor file on Collection Agent". In BMC. Mar. 20, 2017, retrieved Mar. 5, 2020.
International Search Report dated Apr. 6, 2020 for PCT/US20/12116.
European Search Report dated Nov. 30, 2023 for application No. 20 735 985.2.
Anonymous: "Hash table", Dec. 9, 2018, pp. 1-17, XP093105542, retrieved from the Internet:https://en.wikipedia.org/w/index.php?title=Hash_table&oldid=872824371 retrieved on Nov. 24, 2023.
Anonymous: "Distributed hash table", Oct. 8, 2018, pp. 1-9, XP093105547, retrieved from the Internet:https://en.wikipedia.org/w/index.php?title=Distributed_hash_table&oldid=863137007, retrieved on Nov. 24, 2023.

* cited by examiner

SYSTEM AND METHOD FOR SCALABLE FILE FILTERING USING WILDCARDS

CROSS-REFERENCE TO RELATED APPLICATIONS

This application is a national phase filing of PCT/US20/12116, filed Jan. 3, 2020 and entitled "System and Method for Scalable File Filtering Using Wildcards", which claims the benefit of U.S. Provisional Patent Application Ser. No. 62/788,175, filed Jan. 4, 2019, entitled "Scalable File Filtering Methods Using Wildcards" both of which are incorporated by reference herein in their entirety.

FIELD OF THE INVENTION

The present invention relates to computer memory management, and more particularly, is related to monitoring access to computer files of interest.

BACKGROUND OF THE INVENTION

Hashing is a technique that allows to convert a range of key values into a range of indexes of an array. A hash table is a data structure which stores data in an associative manner. In a hash table, data is stored in an array format, where an index (hash) value is used to look up (access) a corresponding data entry (or "bucket" or "slot" or "bin") containing data. Accessing data in a hash table is very fast if the index of the desired data entry in the hash table is known. Thus, a hash table is a data structure in which insertion and search operations are very fast irrespective of the size of the data, A hash table uses an array as a storage medium and uses hash technique to generate an index to locate the entry in the hash table where an element is to be inserted or retrieved.

Organizations have an interest in protecting sensitive information. In particular, an organization may wish to restrict and/or monitor access to computer files containing sensitive information. Monitoring of computer file access typically involves detecting file access commands, such as copy, move, delete, et cetera. Previously, access to a file of interest could be determined by comparing a file access command against a list of files of interest. While this is relatively simple when comparing access of a single file to a small list of files of interest (for example, less than one hundred files of interest), the process may become resource intensive when comparing a long list of accessed files to a long list of files of interest. Adding a wildcard (a placeholder such as '*', or '?' indicating one or more unspecified characters) to the search pattern can increase the complexity by at least an order of magnitude, thereby straining computer processing resources.

This problem may be analogized to a dictionary search. There are multiple methods for pattern match searches within a dictionary, but none of them efficiently address the case of a dictionary search using patterns with and without wild cards while preserving capability of performing changes within the dictionary. The nearest approach is linear matching which suffers from high complexity. Therefore, there is a need in the industry to address the abovementioned shortcomings.

SUMMARY OF THE INVENTION

Embodiments of the present invention provide a system and method for scalable file filtering using wildcards. Briefly described, the present invention is directed to a system that monitors access to computer files against a dynamically changeable non-heterogeneous collection load balanced across two hash tables. User activity is monitored on a target device to detect a user entered pattern including a wildcard character. A server in communication with the target device, receives the user entered pattern, selects one of the two hash tables, and calculates an index for the selected hash table based on the user entered pattern. The index is used to access the selected hash table to receive a stored pattern. The hash tables each have a plurality of entries, and each entry includes a list of one or more patterns that have the same hash index but different pattern values sorted by length in characters from longest to shortest.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

The following definitions are useful for interpreting terms applied to features of the embodiments disclosed herein, and are meant only to define elements within the disclosure.

As used within this disclosure, a "pattern" refers to a sequence of characters organized as a text string. While embodiments described below generally use the pattern to refer to a file pathname, the invention is applicable to any pattern of characters.

As used within this disclosure, a "wildcard character" refers to a placeholder represented by a single character in a pattern, such as an asterisk (*), which can be interpreted as a number of literal characters or an empty pattern. Wildcard characters are often used in file searches so the full pattern need not be typed. In Unix-like and DOS operating systems, the asterisk character (*, also called "star") matches zero or more characters, while the question mark (?) matches exactly one character. The characters occurring in the pattern before the wildcard character are referred to as the "prefix," and the characters occurring in the pattern after the wildcard are referred to as the "postfix."

As used within this disclosure, a "collection" refers to a non-heterogeneous list of patterns, for example a list of file names stored as entries in a database. For the embodiments described herein, the collection is distributed across two tables. Usage of two or more hash tables greatly reduces chances that a bucket in the hash table will contain long linked list, ideally each bucket will contain one entry only.

As used within this disclosure, a "non-heterogeneous list" refers to a collection containing patterns with wildcards mixed with patterns without wildcards.

As used within this disclosure, a "search" refers to a case insensitive character search of a dynamically changeable non-heterogeneous collection.

Figure 9A:
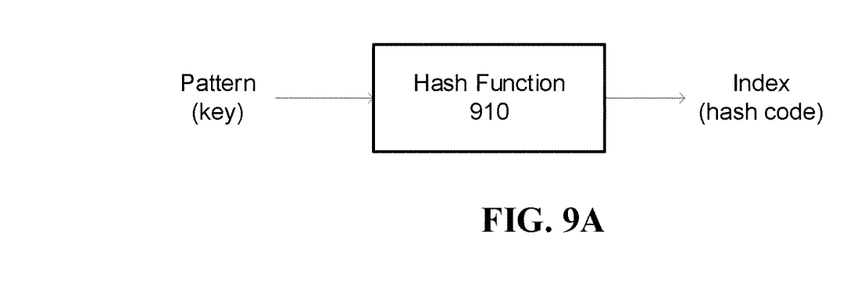
FIG. 9A is a block diagram of a hash function.

As used herein, a "hash function" is a process (see FIG. 9A) that receives a key as an input and calculates a hash code output. Here, the key is a pattern, and the hash code is an index value used to access a corresponding bucket of a hash table.

Figure 9B:
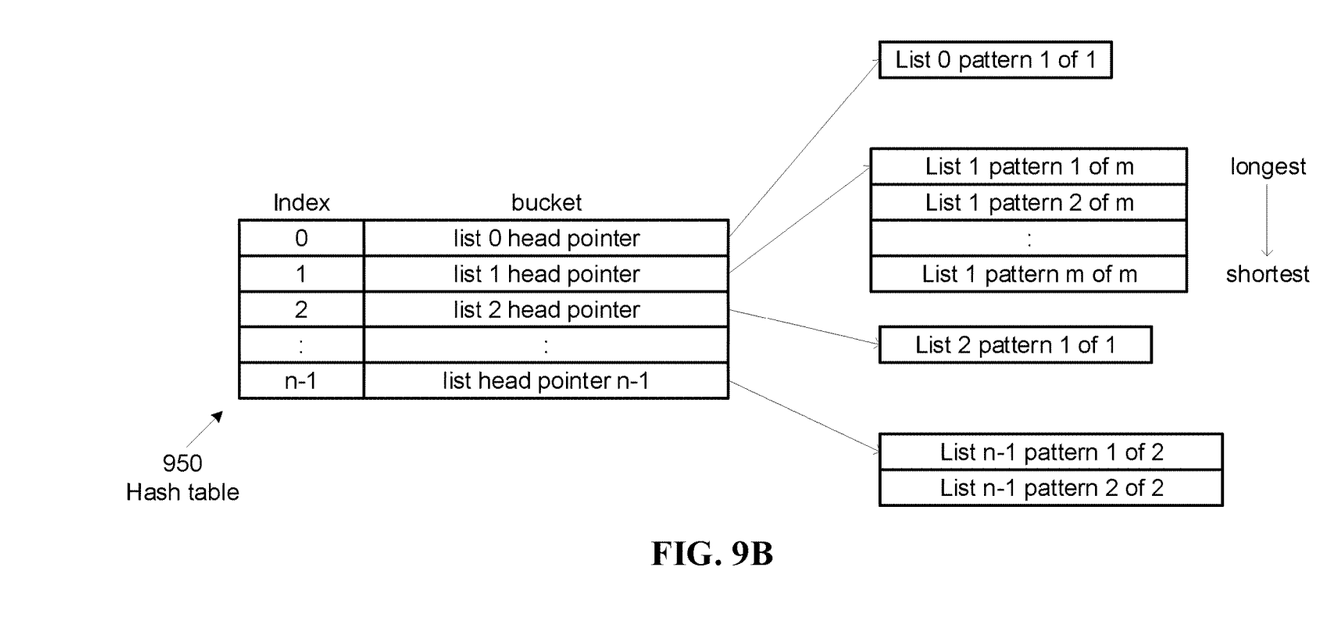
FIG. 9B is a schematic diagram of an exemplary hash table structure used by the forward and reverse hash tables.

As used within this disclosure a "hash table" is a data structure (see FIG. 9B) having an indexed array of buckets where each bucket contains a pointer to the head of an ordered (linked) list of patterns, each pattern corresponding to the key used by the hash function to calculate the index. The list of patterns is ordered in character length from longest to shortest. For the embodiments described herein, keys are numerical values calculated by a hash function, each hash bucket contains list of hash entries with same hash key. Each pattern in the list is a single (and unique) pattern of the collection. It should be noted that while FIG. 9B shows consecutive index values with no gaps, there may be instances where a consecutive index value is skipped, for example if n=6, the indexes may be (0, 1, 4, 9, 10, 11).

As used within this disclosure, a "stack" is a data structure containing a variable plurality of ordered entries, where adding a subsequent entry to the stack pushes all previous entries down in the stack, and "popping" the stack refers to removing the topmost entry in the stack such that the next sequential stack entry moves up to become the topmost entry.

As used within this disclosure a "collision" refers to a condition during a database search by a hash index yields more than one result.

As used within this disclosure "amortized complexity" relates to amortized analysis and formally can be described as the total expense (in terms of consumption of computer resources) per operation, evaluated over a sequence of operations. This guarantees the total expense of the entire sequence, while permitting individual operations to be much more expensive than the amortized cost.

Reference will now be made in detail to embodiments of the present invention, examples of which are illustrated in the accompanying drawings. Wherever possible, the same reference numbers are used in the drawings and the description to refer to the same or like parts.

Embodiments of the method disclosed herein are generally applicable to a dynamic (changeable at run time) collection of pathnames to tracked files, for example, files containing information sensitive to an organization. The collection may contain thousands of entries that change in real time in response to user actions. The tracked file may be entered into the collection either by full path name without wildcards, or a (partial) pathname including wildcards. An operation matching the pattern against the collection is expected to be very fast, not affected (performance wise) by the size of the collection and/or changes performed within the collection.

As described below in greater detail with regard to FIG. 8, the method embodiments described below may be implemented in a system with a monitor application 800 having an agent 820 (FIG. 8) and a monitor application server. The agent 820 may be installed in a host device (for example, a computer 810 such as a desktop computer). The agent 820 is preferably implemented as an extension to the operating system (OS) 815 of the host device 810. An OS extension may leverage existing functionality of the OS 815 via one or more OS application programming interfaces (API), thereby operating in a manner consistent with the designers of the OS 815 that is unlikely to interfere with the normal operations of the host device 810.

For example, on an Apple Macintosh computer, the OS Accessibility API provides extensions so user interface devices (for example, keyboards, mice, trackpads, etc.) may be customized to accommodate users with special needs. An Accessibility OS profile provides access to events such as keystrokes, mouse clicks, and other user activities that may be leveraged to monitor usage of the host device. Similar OS hooks are available for other operating systems. The agent 820 may be implemented as a background process, such as a daemon, which may be installed in the computer 810 by a (human) system administrator 802 in a manner that is invisible and unobtrusive to a user 801 of the host device. Further, unlike a stand-alone application, the background process may not be inadvertently (or intentionally) disabled by the user 801 who does not have system administrator privileges.

The agent 820 may be configured to monitor for specific patterns of user activity, and to log and transmit log entries to the monitor application server 830. The monitor application server 830 may then catalog the user activity in a database stored within the server data store 863, and/or scan the log entries against a table of rules to determine if the host device 810 is being used in a manner of interest/concern. A console user (human) 803 may access the monitor application server 830, for example, using a web browser.

In general, it is desirable that the agent 820 operate in an unobtrusive manner, for example, without noticeably drawing on resources of the host device 810, such as processor power, storage capacity/throughput, and/or communication bandwidth.

The agent 820 is notified by the OS 815 when the user 801 enters a command to find and/or access a file on the computer 810. The agent 820 extracts a pattern (string) from the command that may contain a wildcard. The agent 820 uses the pattern to access a collection, for example a database on the server data store 863 or the agent data store 862 containing filenames of sensitive files that the system administrator 802 wishes to monitor. The agent 820 uses one or more of the scalable file filtering methods using wildcards described in the embodiments below.

Figure 1:
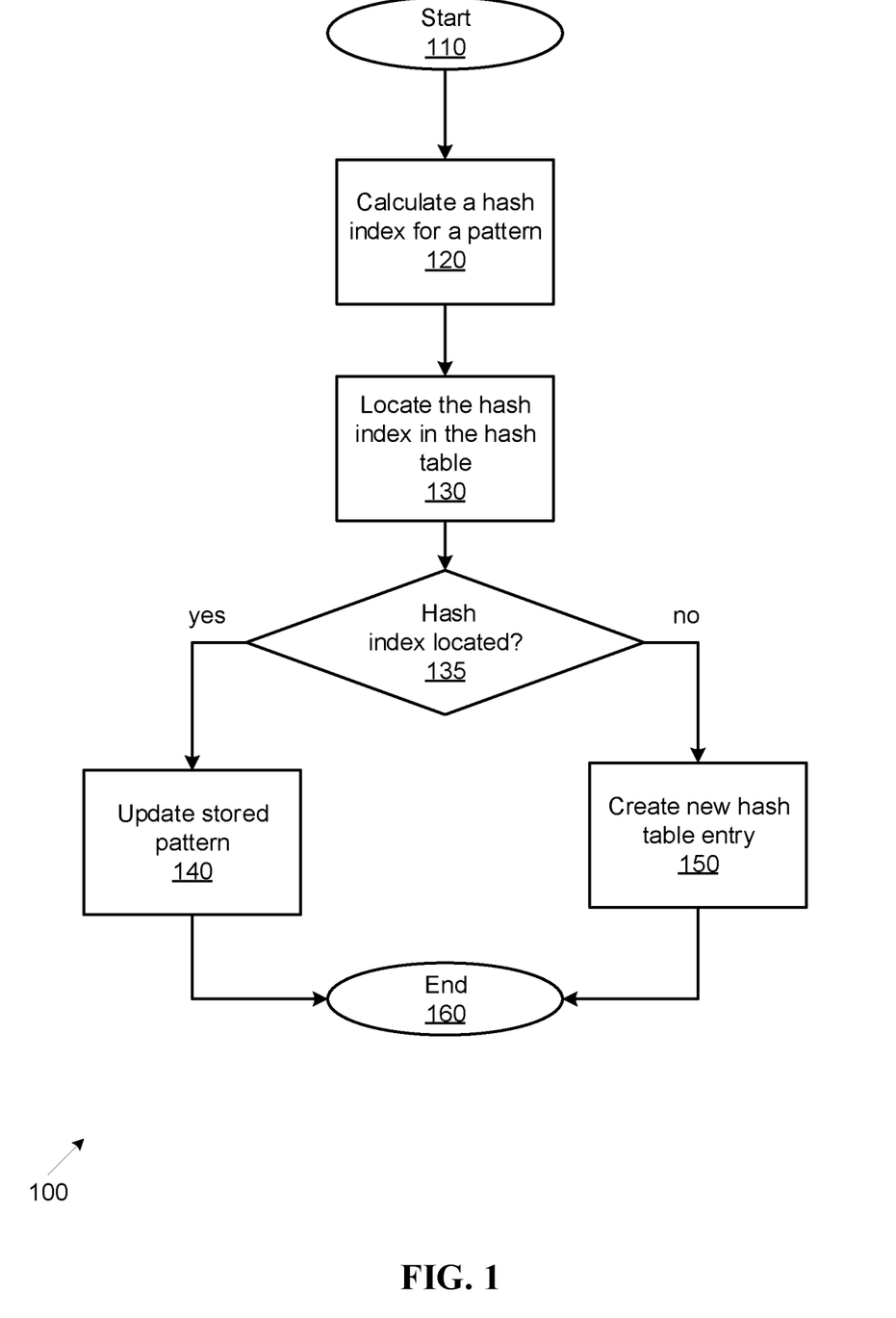
FIG. 1 is a flowchart showing a method for insertion of a pattern into a collection stored in a hash table.
Figure 2:
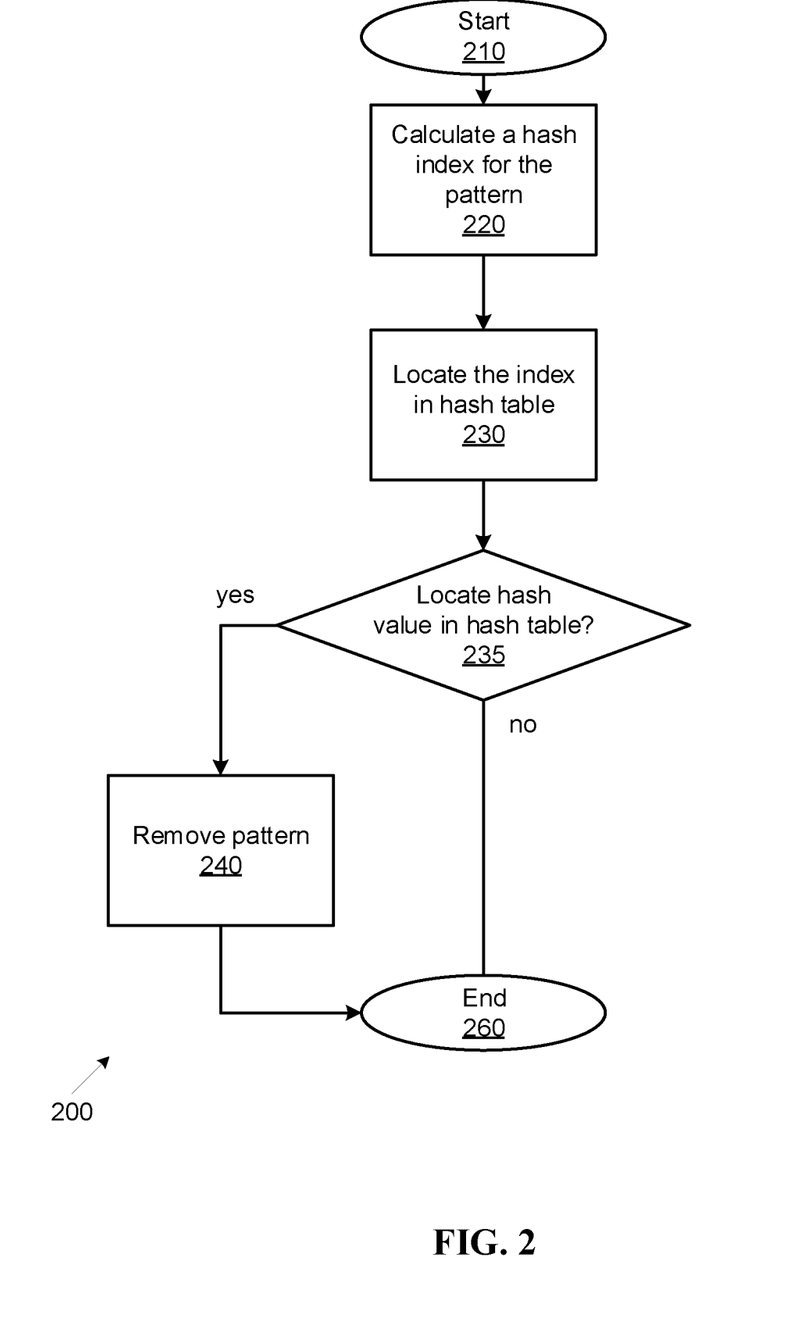
FIG. 2 is a flowchart showing a method for removal of a pattern from a collection stored in a data structure with a hash table.
Figure 3:
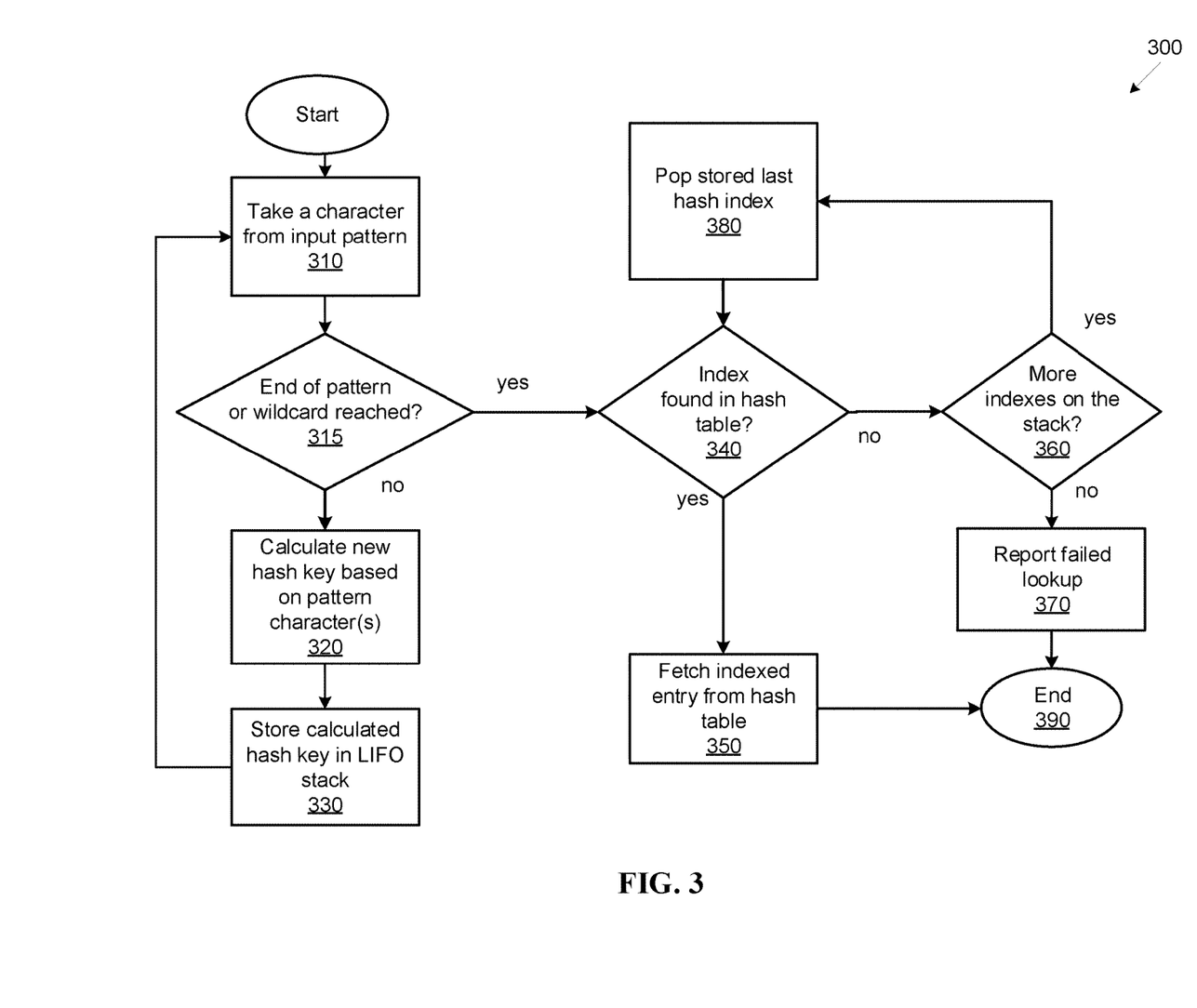
FIG. 3 is a flowchart showing a method for looking up a pattern in a collection stored in a hash table.

FIGS. 1-3 are flowcharts for exemplary methods for using a data structure to preserve patterns of a collection in a hash table. FIG. 1 is a flowchart 100 showing a method for insertion of a pattern into a collection with a hash table 950 (FIG. 9B). A hash function 910 (FIG. 9A) receives the pattern and calculates an index, as shown by block 120, for example a string hashing function such as a polynomial rolling hash function, among other possible hash functions. An attempt is made to locate the index in the hash table 950 (FIG. 9B), as shown by block 130, and the flow branches depending upon whether or not the index is located, as shown by block 135. If the index is located, the pattern the hash table (bucket) is updated, as shown by block 140. In the case where the bucket contains an ordered list of patterns, the pattern is added to the list according to the size of the pattern. If the index is not located, a new hash table entry (array row) for the pattern is created in the hash table indexed by the index, as shown by block 150. FIG. 2 is a flowchart 200 showing a method for removal of a received pattern from a collection with a hash table 950 (FIG. 9B). An index is calculated for the received pattern, as shown by block 220. An attempt is made to locate the index in the hash table 950 (FIG. 9B), as shown by block 230, and the flow branches depending upon whether or not the index is located, as shown by block 235. If the index is located, the associated entry in the hash table 950 (FIG. 9B) is removed from the hash table 950 (FIG. 9B), as shown by block 240. If removing the entry results in an empty bucket, the index (key) is removed from the hash table.

When each pattern in a collection is discrete (i.e. contains no wildcards), the performance characteristics of the operations shown in FIGS. 1-2 are not significantly different from a standard pattern matching using a hashed value solution. The performance improvements using the methods 100, 200, becomes noticeable when patterns with wildcards (i.e. contains "*" and/or "?" characters) are inserted into the collection (non-heterogeneous collection). As described further below, the embodiments incorporate load balancing across two tables to achieve these performance improvements. In such cases, the index is initially calculated (on insert) up to a first appearance of a wild card character in the pattern. For example, for a forward hash table the pattern "test*this", the forward index is calculated for "test" only (for a forward table: as described below, for a reverse hash table, a reverse index is calculated for "siht" only), Thereafter, the pattern is inserted into the hash table by the calculated index. Each hash table entry indexed by the hash value contains a head pointer a list of entries that has the same index but different pattern values, for example: "test", "test?" and "test*this". Since a search of the hash table returns the first matching entry, the entries in the list are sorted by pattern length from longest to shortest ("test*this">"test?">"test") to ensure that, in case of a collision on lookup, the index is used to locate the bucket and the most detailed matching pattern in the bucket is located first, for example, if a lookup performed for "teststring," then between the two choices of "test*" and "test?tring", "test?tring" is chosen as the match because it more detailed.

FIG. 3 is a flowchart 300 showing a method for looking up a received pattern in a collection stored in a data structure with a single hash table. The pattern that is being searched for in the collection is incrementally hashed (blocks 310-330), such that a first incremental hash index is created for a first character in the pattern at the start as shown by block 310.

For the incremental search, a first branch (block 320) if the pattern is not empty or the incremental character taken in block 310 is not a wildcard, as shown by block 315, an incremental hash key is calculated by an incremental hash function for the accumulated characters, as shown by block 320. For example, an incremental hash function that calculates a hash H(n) for n characters is: $H(n)=F(H(n-1))+T(n)$, where F represents a function that transforms the value of H(n−1) and T represents a function that changes value of n−1 character. Given the hash value of H(n−1) and value of n-th character, H(n) may be calculated. The incremental hash key is placed on (pushed onto) a LIFO (last-in-first-out) stack of incremental indexes, as shown by block 330, and another character is taken from the input pattern, as shown by block 310. For example, based on the first incremental hash, a second incremental pattern is created for a first character and second characters of the pattern, and a second incremental index is calculated based upon the stored index value. Additional incremental patterns and incremental index are created by continuing in a similar fashion for subsequent characters of the search pattern. When the end of the pattern or a wildcard is reached, the LIFO stack is processed, as shown starting in block 340, until either there is a match or the list of indexes in the LIFO stack is exhausted. Specifically, the hash table is searched for the topmost calculated incremental index in the LIFO stack, as shown by block 340. If the incremental index is found in the hash table, the table entry indexed by the hash value is fetched, as shown by block 350, and the process ends, as shown by block 390. Since the entry may contain linked list of values with same index, after the entry was fetched, each element of the linked list compared to the search pattern until either a match found. If the end of the list end is reached without a match, the process continues.

Returning to block 340, if the incremental index is not found in the hash table, if there are more indexes on the stack, as shown by block 360, the top hash value on the stack is popped, as shown by block 380, and control branches back to block 340. If none of the indexes in the stack are found, that is, the index stack has been depleted without finding a match in the hash table, a failed lookup is reported, as shown by block 370, and the process ends, as shown by block 390.

The approach in the flowchart 300 may be used to distinguish between, for example, a stored hash pattern of "test*this" with real pattern "test the very string." Since both the stored patterns share the same hash index calculated for the pattern "test", on lookup a match occurs when the LIFO stack of stored hashes reach value of hash for "test" either of these search patterns.

Hash table degradation may occur if a search pattern begins with the wildcard "*" or just very few characters before "*". Here, the hash is based on very few characters, resulting in many matching paths. For example, patterns like "te*ster" and "te*sting" have same prefix of "te" which will generate an identical hash value. If enough entries with the same prefix are accumulated, performance degradation may result due to performing linear searches within the hash bin matching prefix (key) of "te". To avoid hash table degradation due to too many entries associated with same hash index, the present embodiments employ load balancing, which may use a plurality of hash tables, for example:

A direct (forward) hash table that hashes patterns left-to-right, such that the first character in the pattern is hashed first.

A reverse hash table that hashes patterns in reverse order, right-to-left, such that the last character in the pattern is hashed first (i.e. "test" from direct hash table will be hashed as "tset").

Upon an insert operation request, the embodiments evaluate which hash table is most efficient in terms of performance for use with a given pattern. The choice of hash table may be determined by comparing the number of characters from the beginning or end of the search pattern before a wildcard is encountered. The hash table may be selected based on whether the direct or reverse hash would include a larger number of characters. Alternatively, the method may keep a count (list length, or "hit count") of entities contained in each hash table bucket, and when a new entry is created, count entries for the direct hash entry bin and the reverse hash, and select the table with the smaller hit count, Other criteria may also be used to select the direct or reverse hash table, Use of a direct and reverse hash table significantly reduces the possibility of hash table degradation.

Figure 4A:
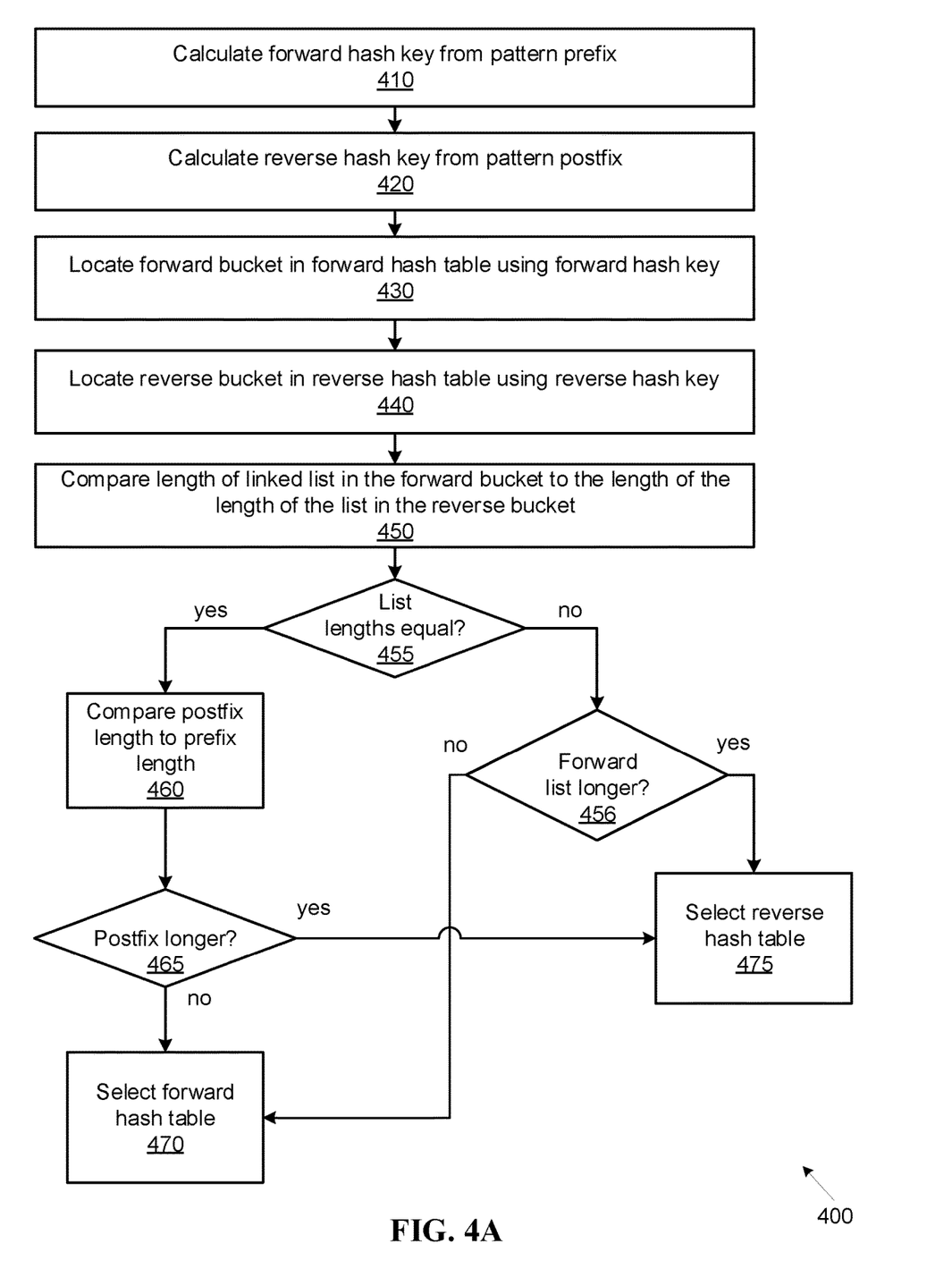
FIG. 4A is a flowchart showing a method for selecting a hash table based upon a pattern.
Figure 4B:
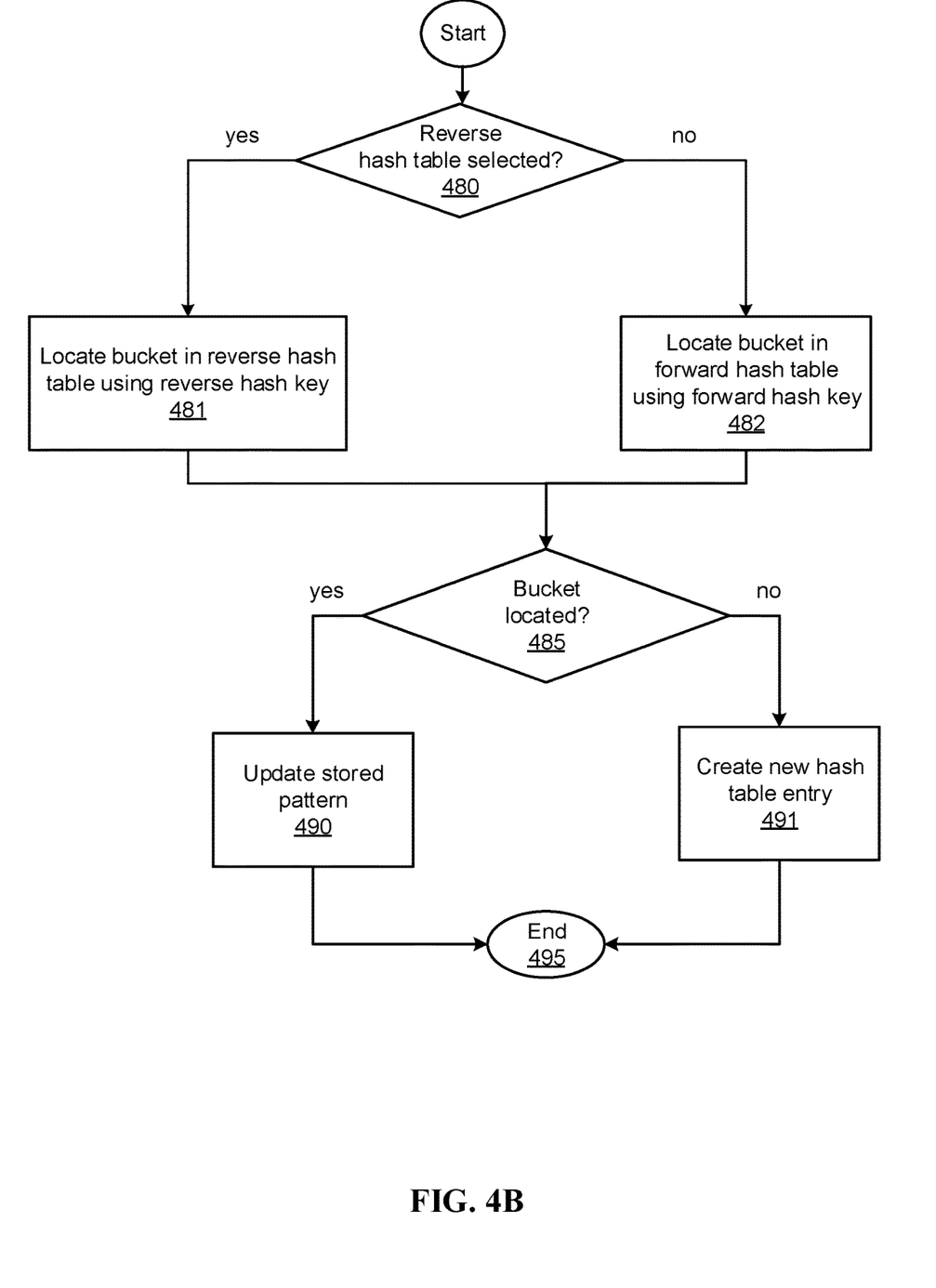
FIG. 4B is a flowchart showing a method for insertion of a pattern into a collection stored in hash tables.
Figure 5:
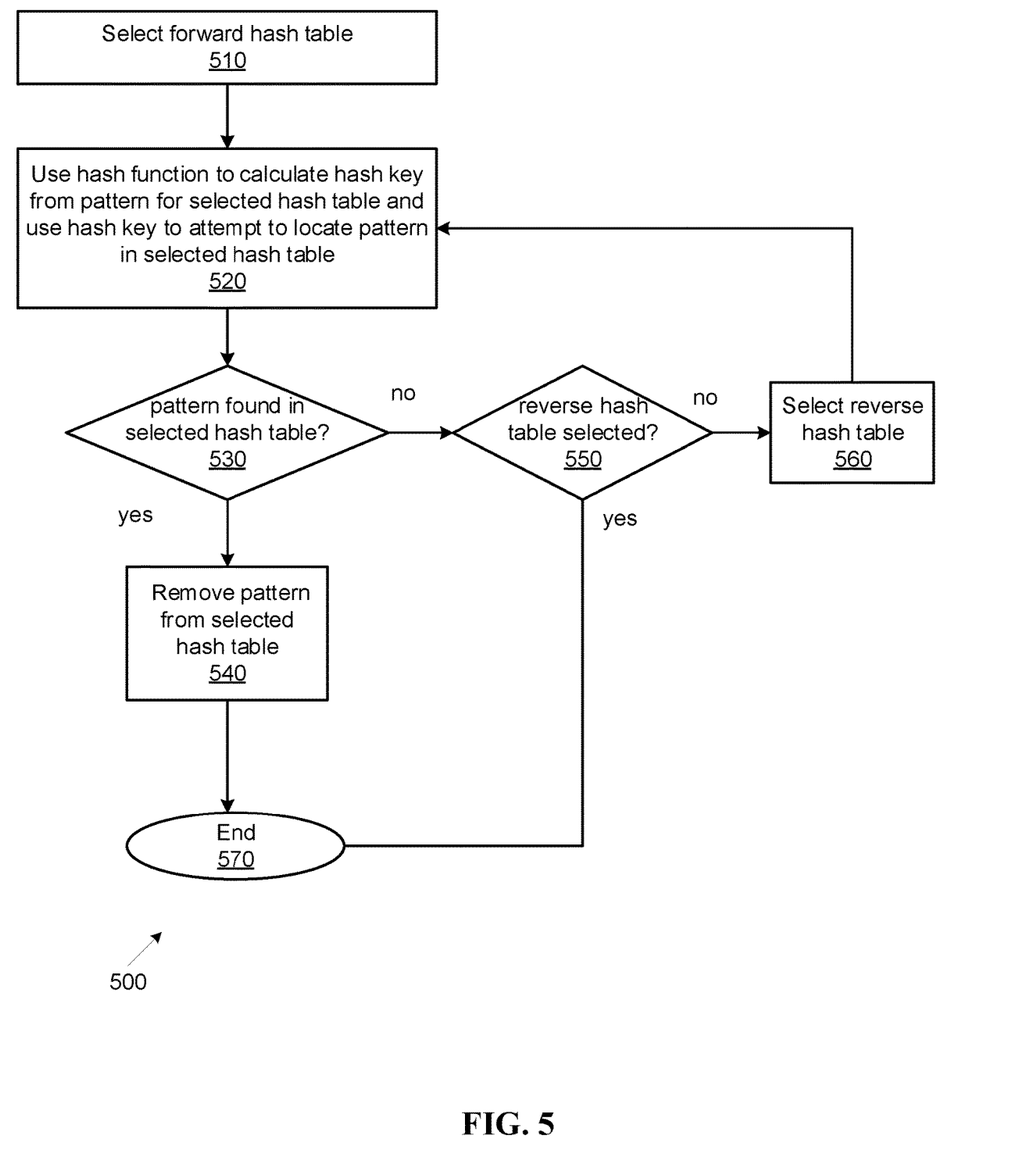
FIG. 5 is a flowchart showing a method for removal of a pattern from a collection stored in hash tables.
Figure 6:
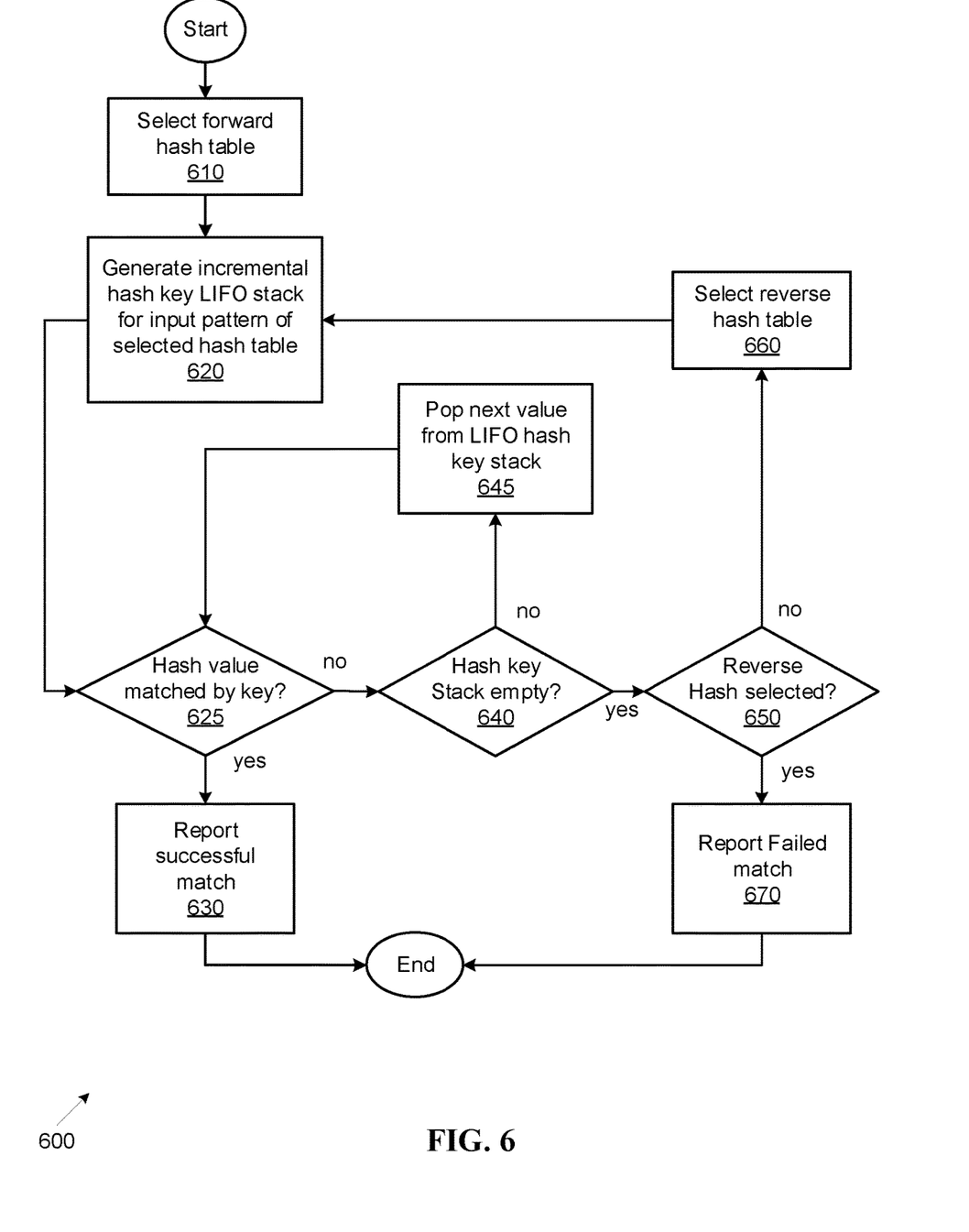
FIG. 6 is a flowchart showing a method for looking up a pattern in a collection stored in hash tables.

FIGS. 4-6 are flowcharts illustrating exemplary methods for using a data structure to preserve collected patterns based on two hash tables. For the sake of simplicity, two hash tables are described here: direct (forward) and reverse. The methods may be expanded to apply to more than two hash tables.

FIG. 4A is a flowchart 400 showing a method for selecting the forward hash table or the reverse hash table based upon a pattern. Using a hash function, a forward hash key is calculated from the pattern prefix, as shown by block 410. Similarly, a reverse hash key is calculated from the pattern postfix, as shown by block 420. The forward hash key used as an index to locate a forward bucket in the forward hash table, as shown by block 430. The reverse hash key is used as an index to locate a reverse bucket in the reverse hash table, as shown by block 440. Each bucket in the forward and reverse hash table contains a pointer to the head of a respective linked list of patterns. The length of the forward list in the forward bucket is compared with the length of the reverse list in the reverse bucket, as shown by block 450. If the lengths of the forward and reverse lists are equal, as shown by block 455, the length of the postfix is compared to the length of the prefix, as shown by block 460. If the postfix is longer, the reverse hash table is selected to store the pattern, as shown by block 475, otherwise the forward hash table is selected to store the pattern, as shown by block 470.

Returning to block 455, if the forward and reverse lists are not of equal length, if the forward list is longer, as shown by block 456, the reverse hash table is selected, as shown by block 480, otherwise the forward linked list is selected, as shown by block 470.

FIG. 4B is a flowchart showing a method for inserting a pattern into a selected hash table. FIG. 4B assumes that a hash table has been selected as per FIG. 4A. If the reverse hash table was selected, as shown by block 480, the bucket in the reverse hash table is located using the reverse hash key, as shown by block 481. If the forward hash table was selected, as shown by block 480, the bucket in the forward hash table is located using the forward hash key, as shown by block 482. If the bucket is located, as shown by block 485, the pattern stored in the bucket is updated, as shown by block 490. If the bucket is not located, as per block 485, a new hash table entry is created in the selected hash table indexed by the corresponding hash key, as shown by block 491.

FIG. 5 is a flowchart showing a method for removal of a pattern from a collection stored in a data structure with two hash tables, here a forward and reverse hash table. The forward hash table is selected, as shown by block 510. A hash function is used to calculate a hash key from the pattern for the selected hash table, and the calculated hash key is used to attempt to locate the pattern in the selected hash table, as shown by block 520. If the pattern is found in the selected hash table, as shown by block 530, the pattern is removed from the selected hash table, as shown by block 540. If the pattern is not found in the selected hash table as show by block 530, if the reverse hash table is not the selected hash table, as shown by block 550, the reverse hash table is selected, as shown by block 560, and control returns to block 520. If the pattern is not found in the reverse hash table, the process ends, as shown by block 570.

FIG. 6 is a flowchart showing a method for looking up an input pattern in a collection distributed across two hash tables, here a forward and reverse hash table. The forward hash table is selected, as shown by block 610, An incremental hash key LIFO stack is generated for the input pattern of the selected hash table, as shown by block 620. The incremental hash key LIFO stack may be created as described above with reference to blocks 310-330 of FIG. 3. If a hash value of the selected hash table is matched by the key, as shown by block 625, a successful match of the input pattern is reported, as shown by block 630, If the hash value is not matched, and the hash key LIFO stack is not empty, as shown by block 640, the next value is popped from the LIFO hash key stack, as shown by block 645, and control returns to block 625. If the hash value is not matched and the hash key stack is empty, the selected hash table has been exhausted, so if the selected hash table is not the reverse hash table, as shown by block 650, the reverse hash table is selected, as shown by block 660, and control is returned to block 620, where an incremental hash key LIFO stack is generated for the reverse hash table. If, at block 650, the reverse hash table was selected, then both hash tables have been exhausted, so a failed match is reported, as shown by block 670.

Table 1 contains a sequence of eight user entered patterns to serve as an example to illustrate the load balancing as performed by the embodiments, which perform an assessment of each pattern in order to decide which kind of hash table is most appropriate to be used. For simplicity, the example starts with empty forward and reverse hash tables as the condition of empty allows for the assumption that a hit count (the number of patterns in the linked list referenced by each bucket of the respective hash table) for each pattern is equal (zero), so no load balancing is required for the first pattern. The pattern of "*text*.sys" will be used with reverse hash table because the pattern has a more informative postfix of ".sys" in comparison with an empty prefix.

TABLE 1

Example sequence of user entered patterns.

| Sequence | Pattern | Hash table | Hash key(emulated) |
| --- | --- | --- | --- |
| 1 | C:\user\test*.txt | Forward | 20 |
| 2 | C:\user\test*.exe | Reverse | 2 |
| 3 | C:\user\test*.sys | Reverse | 4 |
| 4 | C:\user\test*.dll | Reverse | 8 |
| 5 | C:\user\example1.txt | Forward | 260 |
| 6 | C:\user\example2.txt | Forward | 344 |
| 7 | *test*.sys | Forward | 1 |
| 8 | *testagain*.sys | Reverse | 4 |

The sequence column of Table 1 indicates the order of insertion of the corresponding pattern into the collection. The pattern column has the pattern to be stored in the collection, here a text string corresponding to a file pathname. The hash table column indicates the hash table chosen to store the pattern (either forward or reverse) based on the method 400 of FIG. 4. The hash key column is the numeric value of hash calculated by the hash function based upon either the prefix or postfix of the pattern, where the prefix is used if the forward hash table is used, and the postfix is used if the reverse hash table is used. Here, the hash key values are exemplary arbitrarily chosen placeholders, not real hash values.

In this example of Table 1, the user adds the patterns in Table 1 to the collection in the sequence order of 1 to 8. An evaluation of pattern (1) places pattern (1) in the forward hash table because the prefix of "c:\user\test" has more characters than postfix of ".txt". When a subsequent pattern is processed, the embodiments make similar evaluation as for the first pattern, but also find that, due to entry of the first pattern in the forward hash table, there is hash table entry with similar prefix of "c:\user\test" so when the embodiment compares the hit count of the pattern (2) prefix "c:\user\test" (hit count=1) with hit count of postfix ".exe" (hit count=0), since the postfix hit counter is lower than the prefix hit count, pattern (2) is placed into reverse hash table.

Using same approach, patterns (3) and (4) are placed into the reverse hash table. Patterns (5) and (6) contains no wildcards, so there is no prefix and postfix to compare, in such cases the patterns are placed in the forward hash table. Pattern (7) has an empty prefix, but the empty prefix has a 0 hit counter in the forward table, while postfix of ".sys" already appears in the reverse table (because of pattern (3)), therefore pattern (7) is placed into the forward table. Pattern (8) is placed into the reverse table, because although the hit counters are equal for the forward table (based on the prefix) and reverse table (based on the postfix), the postfix of ".sys" more detailed than the empty prefix.

Figure 7:
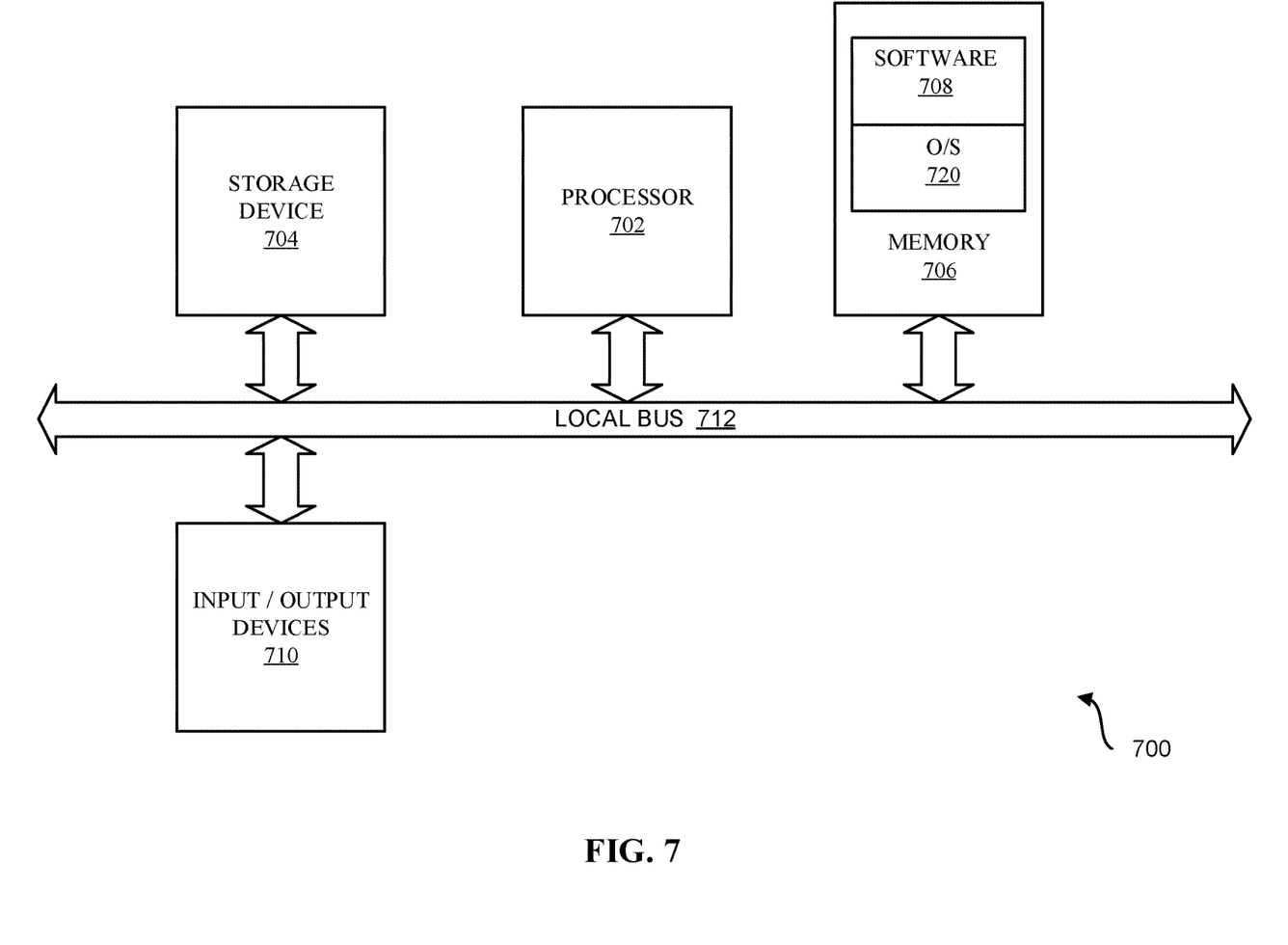
FIG. 7 is a schematic diagram illustrating an example of a system for executing functionality of the present invention.

The present system for executing the functionality described in detail above may be a computer, an example of which is shown in the schematic diagram of FIG. 7. The system 700 contains a processor 702, a storage device 704, a memory 706 having software 708 stored therein that defines the abovementioned functionality, input and output (I/O) devices 710 (or peripherals), and a local bus, or local interface 712 allowing for communication within the system 700. The local interface 712 can be, for example but not limited to, one or more buses or other wired or wireless connections, as is known in the art. The local interface 712 may have additional elements, which are omitted for simplicity, such as controllers, buffers (caches), drivers, repeaters, and receivers, to enable communications. Further, the local interface 712 may include address, control, and/or data connections to enable appropriate communications among the aforementioned components.

The processor 702 is a hardware device for executing software, particularly that stored in the memory 706. The processor 702 can be any custom made or commercially available single core or multi-core processor, a central processing unit (CPU), an auxiliary processor among several processors associated with the present system 700, a semiconductor based microprocessor (in the form of a microchip or chip set), a macroprocessor, or generally any device for executing software instructions.

The memory 706 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 706 may incorporate electronic, magnetic, optical, and/or other types of storage media. Note that the memory 706 can have a distributed architecture, where various components are situated remotely from one another, but can be accessed by the processor 702.

The software 708 defines functionality performed by the system 700, in accordance with the present invention. The software 708 in the memory 706 may include one or more separate programs, each of which contains an ordered listing of executable instructions for implementing logical functions of the system 700, as described below. The memory 706 may contain an operating system (O/S) 720. The operating system essentially controls the execution of programs within the system 700 and provides scheduling, input-output control, file and data management, memory management, and communication control and related services.

The I/O devices 710 may include input devices, for example but not limited to, a keyboard, mouse, scanner, microphone, etc. Furthermore, the I/O devices 710 may also include output devices, for example but not limited to, a printer, display, etc. Finally, the I/O devices 710 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 700 is in operation, the processor 702 is configured to execute the software 708 stored within the memory 706, to communicate data to and from the memory 706, and to generally control operations of the system 700 pursuant to the software 708, as explained above. The operating system 720 is read by the processor 702, perhaps buffered within the processor 702, and then executed.

When the system 700 is implemented in software 708, it should be noted that instructions for implementing the system 700 can be stored on any computer-readable medium for use by or in connection with any computer-related device, system, or method. Such a computer-readable medium may, in some embodiments, correspond to either or both the memory 706 or the storage device 704. In the context of this document, a computer-readable medium is an electronic, magnetic, optical, or other physical device or means that can contain or store a computer program for use by or in connection with a computer-related device, system, or method.

Instructions for implementing the system can be embodied in any computer-readable medium for use by or in connection with the processor or other such instruction execution system, apparatus, or device. Although the processor 702 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 700 is implemented in hardware, the system 700 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 8:
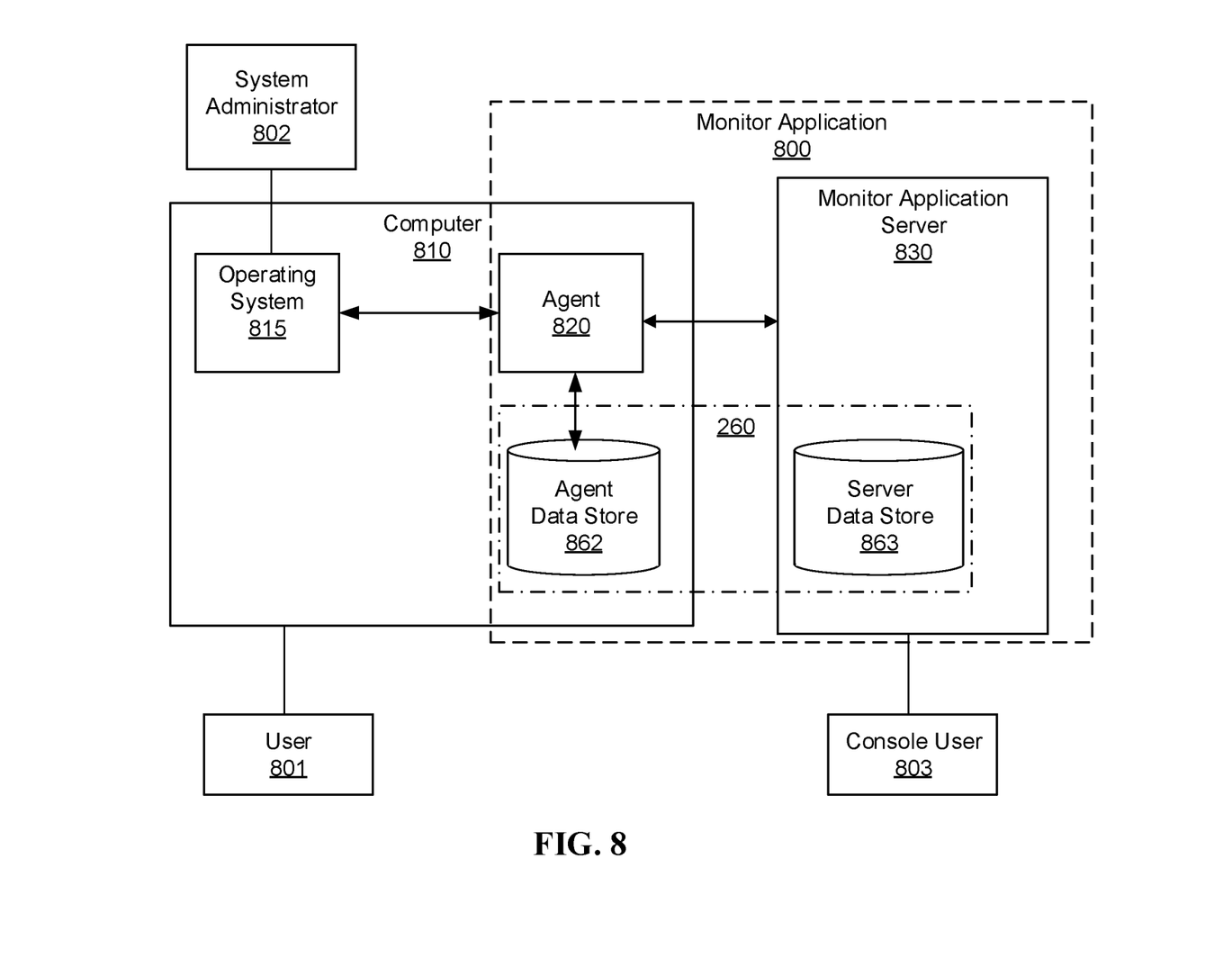
FIG. 8 is a block diagram of an embodiment of a system implementing the embodiments.

FIG. 8 is a schematic diagram of an exemplary distributed implementation of the monitor application 800. The monitor application 800 includes an agent 820 that is resident in the computer 810, and a monitor application server 830, which as implemented here is remote from the computer 810, for example, in communication with the agent 820 via a wired or wireless communication network such as a local area network, a wide area network, or via the internet, for example, a cloud based server. The Agent 820 may be configured to communicate with the operating system 815 of the computer 810, for example, the agent 820 may register for notifications from the operating system 815 when a specific user related activity is detected by the operating system 815. Upon receipt of a notification from the operating system 815 by the agent 820, the agent 820 may communicate notification data received from the operating system 815 to the monitor application server 830. For example, the agent 820 may forward all received notification data to the monitor application server 830, or the agent may selectively forward selected notification data to the monitor application server 830, for example the agent 820 may be configured by the monitor application server 830 with a selection criteria to determine what notification data to forward to the monitor application server 830. The data store 860 may be distributed between an agent data store 862 resident on the computer 810 and a server data store 863 resident on the monitor application server 830.

The agent 820 may be tailored to communicate with a specific operating system 815 resident on the computer 810. For example, the agent 820 may be specific to Windows OS, MacOS, or Unix/Linux, among others. While FIG. 2 shows a single monitor application server 830, the monitor application server 830 may be distributed across two or more physical server devices. Likewise, the server data store 863 may be distributed across two or more physical server devices.

In general, the agent 820 may be configured to act as an intermediary between the operating system 815 and the monitor application server 830, in particular, the agent 820 generally conveys collected data to the monitor application server 830, and the monitor application server operates upon the collected data to determine if targeted activities have been performed by a user 801, here a human operating the computer 810.

As noted previously within this disclosure the user 801 is a human who interacts with the computer 810, the system administrator 802 is a human who controls and configures the operating system 815 of the computer 810, and the console user 803 is a human who controls and interacts with the monitor application 800. Of course, there may be a plurality of users 801, system administrators 802, and/or console users 803, and in some circumstances a system administrator 802 and the console user 803 may be the same individual.

The flow of activity and communication between the components is as follows: The monitor application 800 includes an agent 820 which is installed locally on the computer 810. The agent 820 captures information about user activity, secures it, and sends it to the monitor application server 830. In embodiments where there is more than one monitor application server 830, they may be load balanced with either a software or hardware-based device (not shown). In that case the agents 820 communicate with the load balancer's virtual IP (VIP). The monitor application server 830 analyzes and compresses received data, then stores the data, for example by splitting textual data in an SQL Server database, and graphic images on a file share, where the SQL server database and the file share are stored in the server data store 863. The console user 803 connects to a Web Console Web-based interface to the monitor application 800, for example using a web browser, and search for, replay, run reports and inspect alerts based on the captured user activity. Any component of the data transfer or data storage process can be encrypted, if desired.

In an exemplary application, if the collection includes a list of files each containing data deemed by the system administrator 802 and/or the monitor application server 830 as containing sensitive information, a pattern match in the collection indicates that the user 801 was accessing a file containing sensitive information. In response, the monitor application server 830 may alert the system administrator 802 of the file access by the user 801.

When patterns do not include wildcards, the amortized complexity of the pattern search (insert/remove/match) may be described as $O(n)$, where n is size of pattern that the operation performed with, independent of collection size. Such complexity is the best possible result for given case, as it is impossible to perform pattern matching without accessing each character of pattern that being matched, so $O(n)$ can't be improved.

Under the disclosed embodiments, with a collection that contains wildcards the amortized complexity of matching of given pattern is identical to the complexity with a wildcard that matches the pattern, which is optimal result for given case.

Therefore, the described embodiments provide matching with optimal performance impact without preventing changes to the collection and dependency on the collection size. As a result, the user can perform searches with many rules including full path names or path names with wildcards and maintain low central processing unit (CPU) overheard searching a path inside it. The embodiments provide for very efficient searches for small file path sizes. The embodiments are still efficient with larger file paths, since on typical operating systems the file path is size limited. The described embodiments are suitable for use in both kernel level and user space level for file path lookups.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for monitoring access to a computer file, comprising:
   a dynamically changeable non-heterogeneous collection load balanced across a first hash table and a second hash table;

a target device comprising a first processor and a first memory configured to contain non-transitory instructions, that when executed, perform the steps of:
  monitoring user activity on the target device to detect a user entered pattern comprising a wildcard character;
a server in communication with the target device, the server comprising a second processor and a second memory configured to contain non-transitory instructions that when executed perform the steps of:
  receiving the user entered pattern from the target device;
  based upon the user entered pattern, selecting a selected hash table consisting of one of the first hash table and the second hash table;
  with a hash function, calculating an index for the selected hash table based on the user entered pattern; and
  accessing the selected hash table with the index to receive a stored pattern, wherein the target device and the server are in communication via a communication network, the collection is accessible via the communication network, and the first hash table and the second hash table each comprise a plurality of entries, each entry of the plurality of entries comprising a list of one or more patterns that have the same hash index but different pattern values sorted by length in characters from longest to shortest.

2. The system of claim 1, wherein the first hash table comprises a direct hash table and the second hash table comprises a reverse hash table.

3. The system of claim 1, wherein the monitoring and forwarding steps are performed by an agent installed in the target device as an operating system (OS) daemon.

4. The system of claim 1, wherein the server is further configured to perform the steps of:
  if the pattern matches an entry in the collection, generating an alert to a system administrator of the target device.

5. The system of claim 1, wherein the collection comprises a list of target computer file pathnames and the pattern comprises at least a partial file pathname.

6. The system of claim 5, wherein if the file access data matches a file in the list of target computer file pathnames, the server is further configured to perform the step of generating an alert to a system administrator of the target device.

7. The system of claim 1, wherein selecting the selected hash table comprises determining a position of the wildcard character within the user entered pattern.

8. The system of claim 1, wherein accessing the selected hash table comprises an incremental search.

9. A computer based method for searching a dynamically changeable non-heterogeneous collection of data entries load balanced across a first hash table and a second hash table, comprising the steps of:
  detecting a user entered pattern comprising a wildcard character;
  based upon the user entered pattern, selecting a selected hash table consisting of one of the first hash table and the second hash table;
  accessing the selected hash table with the hash table index to receive a stored pattern;
  calculating a first incremental hash index based on a first character of the user entered pattern;
  storing the first incremental hash index on a last-in-first-out (LIFO) index stack;
  calculating a second incremental hash index based on the first character and a sequentially adjacent second character of the user entered pattern;
  storing the second incremental hash index on the LIFO hash stack;
  searching for the topmost entry of the LIFO hash stack in the selected hash table; and
  fetching an entry indexed by the topmost hash entry,
  wherein accessing the selected hash table comprises an incremental search.

10. The method of claim 9, further comprising popping the LIFO index stack topmost entry.

11. The method of claim 10, wherein popping the LIFO index stack topmost entry is conditioned upon the topmost index entry of the LIFO index stack not being found in the selected hash table.

12. The method of claim 10, wherein the LIFO index stack topmost entry is not found in the selected hash table, and further comprising reporting a failed lookup of the pattern.

13. The method of claim 12, wherein the LIFO index stack is depleted.

14. A computer based method for searching a dynamically changeable non-heterogeneous collection of data entries load balanced across a first hash table and a second hash table, comprising the steps of:
  detecting a user entered pattern comprising a wildcard character;
  based upon the user entered pattern, selecting a selected hash table consisting of one of the first hash table and the second hash table; and
  accessing the selected hash table with the hash table index to receive a stored pattern,
  wherein accessing the selected hash table comprises an incremental search, and the first hash table comprises a direct hash table and the second hash table comprises a reverse hash table.

15. A computer based method for searching a dynamically changeable non-heterogeneous collection of data entries load balanced across a first hash table and a second hash table, comprising the steps of:
  detecting a user entered pattern comprising a wildcard character;
  based upon the user entered pattern, selecting a selected hash table consisting of one of the first hash table and the second hash table and determining a position of the wildcard character within the user entered pattern; and
  accessing the selected hash table with the hash table index to receive a stored pattern,
  wherein accessing the selected hash table comprises an incremental search.

16. A computer based method for searching a dynamically changeable non-heterogeneous collection of data entries load balanced across a first hash table and a second hash table, comprising the steps of:
  detecting a user entered pattern comprising a wildcard character;
  based upon the user entered pattern, selecting a selected hash table consisting of one of the first hash table and the second hash table and determining a first number of entries in a first index bucket of the first hash table and a second number of entries in a second index bucket of the second hash table; and
  accessing the selected hash table with the hash table index to receive a stored pattern, wherein accessing the selected hash table comprises an incremental search.

\* \* \* \* \*